(12) United States Patent
Diemer et al.

(10) Patent No.: US 7,021,448 B2
(45) Date of Patent: Apr. 4, 2006

(54) CLUTCH DISK FOR A FRICTION CLUTCH

(75) Inventors: Matthias Diemer, Niederwern (DE); Ingrid Hoffelner, Knetzgau (DE)

(73) Assignee: ZF Sachs AG, Schweinfurt (DE)

( * ) Notice: Subject to any disclaimer, the term of this patent is extended or adjusted under 35 U.S.C. 154(b) by 17 days.

(21) Appl. No.: 10/725,736

(22) Filed: Dec. 1, 2003

(65) Prior Publication Data

US 2004/0134742 A1 Jul. 15, 2004

(30) Foreign Application Priority Data

Dec. 11, 2002 (DE) .................................. 102 57 723
Nov. 10, 2003 (DE) .................................. 103 52 427

(51) Int. Cl.
*F16D 13/64* (2006.01)
(52) U.S. Cl. ................. 192/207; 192/70.17; 192/107 C
(58) Field of Classification Search ................ 192/200, 192/207, 212, 214, 70.17, 107 R
See application file for complete search history.

(56) References Cited

U.S. PATENT DOCUMENTS 4,257,510 A * 3/1981 Fisher ........................ 192/207
4,858,742 A * 8/1989 Cameron ................. 192/107 C
6,619,455 B1 * 9/2003 Diemer et al. ............. 192/52.3
6,622,842 B1    9/2003 Diemer et al.
6,626,276 B1 * 9/2003 Diemer et al. ............ 192/30 V
2002/0020598 A1  2/2002 Diemer et al.

FOREIGN PATENT DOCUMENTS

| DE | 33 43 190 | 6/1985 |
| DE | 100 37 898 | 2/2002 |
| GB | 1 100 319 | 1/1968 |

* cited by examiner

*Primary Examiner*—Richard M. Lorence
(74) *Attorney, Agent, or Firm*—Cohen, Pontani, Lieberman & Pavane

(57) ABSTRACT

A clutch disk for a friction clutch includes a friction lining carrier and at least one friction lining element, which is connected to the friction lining carrier for rotation in common with it, and which can shift in the circumferential direction relative to this carrier against the pretensioning effect of a restoring arrangement. The disk also includes a friction device, which generates a frictional force acting in opposition to the displacement of the friction lining element relative to the friction lining carrier.

20 Claims, 11 Drawing Sheets

CLUTCH DISK FOR A FRICTION CLUTCH

BACKGROUND OF THE INVENTION

1. Field of the Invention

The present invention pertains to a clutch disk for a friction clutch comprising a friction lining carrier and at least one friction lining element, which is connected to the friction lining carrier for rotation in common with it and which can be shifted in the circumferential direction relative to the carrier in the direction opposite the preloading action of a restoring arrangement.

2. Description of the Related Art

A clutch disk is known from US 2002/0020598, in which friction lining elements on a friction lining carrier can be shifted to a limited extent in the circumferential direction against the action of elastic arrangements. It thus becomes possible to damp rotational vibrations directly in the area of the connection between the friction lining elements and the friction lining carrier and/or to avoid the occurrence of grabbing vibrations possibly induced by local changes in the frictional relationships. For this purpose it is known, for example, that the two circumferential end areas of the friction lining elements can be supported by springs, elastomeric materials, etc., on radially outward-extending arm sections of the friction lining carrier.

SUMMARY OF THE INVENTION

The task of the present Invention is to provide a clutch disk for a friction clutch that has improved vibration damping behavior for the vibrations associated with the occurrence of rotational irregularities.

According to the present invention, the clutch disk also includes a friction device, which generates a frictional force which has the effect of opposing the displacement of the friction lining element relative to the friction lining carrier.

In addition to the possibility that the friction lining elements can move to a certain extent in the circumferential direction relative to a remaining, it is also provided according to the present invention that, upon the occurrence of this type of movement, a certain amount of kinetic energy is converted into frictional energy and thus dissipated as heat.

This can be realized, for example, in that the rear surface of the friction lining element, i.e., the surface facing away from the friction surface of the element, rests against the friction lining carrier to generate the frictional force. The minimum of one friction lining element can comprise a carrier plate, on which at least one friction lining is carried and which then provides the frictionally-active rear surface.

So that the clutch can be engaged more smoothly upon the execution of a clutch-engaging operation, it is proposed that an axial preloading arrangement be assigned to the minimum of one friction lining element, which arrangement preloads the element in such a way as to reduce or eliminate the frictional interaction between the minimum of one friction lining element and the friction lining carrier at least when the clutch disk is not being gripped. In this way, it is possible for the axial clamping force to be increased gradually in the manner of a spring-loaded lining. It is also possible to realize a delayed and gradual onset of the frictional interaction between the minimum of one friction lining element and, for example, the friction lining carrier.

The axial preloading arrangement can, for example, comprise at least one spring element. According to an embodiment which is especially easy to construct, the minimum of one spring element can be formed on the minimum of one friction lining element.

So that a sufficiently strong frictional force or a frictional force which can be adjusted to a defined value can be provided even in the initial phase of a clutch-engaging operation, it is proposed that the minimum of one spring element act upon the minimum of one friction lining element by way of a friction element, which is free to move relative to the friction lining carrier only in the preloading direction of the minimum of one spring-loading element.

To make it possible for the friction lining element to move in the circumferential direction but also to ensure that this element is held in a defined position in the radial direction on the friction lining carrier, it is proposed that at least one radial retaining projection be formed on the friction lining carrier, this projection extending over the radially outside area of the minimum of one friction lining element.

In an alternative variant, which is especially advantageous because it involves a simplification of the design, a radial retaining area which extends over the radially outside area of the minimum of one friction lining element is provided on a component which holds the minimum of one friction lining element axially on the friction lining carrier.

A significant reduction in the amount of mass in the radially outside area and thus a decrease in the mass moment of inertia can be achieved by forming at least one radial retaining projection on the minimum of one friction lining element, this projection engaging in an assigned opening in the friction lining carrier.

To ensure that a friction lining element is held in a defined circumferential position with respect to the friction lining carrier, it is proposed that the restoring arrangement have restoring elements, which act on the circumferential end areas of the minimum of one friction lining element.

The friction lining elements which can shift in the circumferential direction relative to the friction lining carrier must be supported in a defined manner not only in the circumferential and radial directions but also in the axial direction. For this purpose, it is proposed that the first support area of the restoring elements, i.e., the area which cooperates with the friction lining carrier, be retained axially on the friction lining carrier, whereas their second support area, i.e., the area which cooperates with the minimum of one friction lining element, axially retain the minimum of one friction lining element. This can be realized, for example, by providing the first support area of the restoring elements with an axial retaining opening to hold the friction lining carrier and by providing the second support area with at least one axial retaining opening to hold the minimum of one friction lining element.

In an embodiment with an especially simple design, at least one restoring element comprises at least one leaf spring. So that sufficiently high restoring forces can be made available but also so that a simple design can also be realized at the same time, it is proposed that the minimum of one restoring element comprise a plurality of leaf springs held together by retaining elements. Because the several leaf springs are held together by retaining elements, the springs can be installed as a unit.

Because these types of leaf spring elements are exposed to significant loads throughout their entire service life and because these loads are also transmitted to the friction lining carrier, it is proposed, as a way of avoiding wear in the area of the contact between the leaf springs and the friction lining carrier, that the leaf springs be supported by the retaining elements on the friction lining carrier.

The risk of improper installation of the restoring elements into the clutch disk according to the invention can be reduced by providing an opening in the friction lining carrier to hold at least one restoring element, at least a certain part of this opening being designed to conform to the shape of the restoring element being held in it. Because the shape of the opening conforms to the shape of the restoring element, it is ensured on principle that there is only one way in which this restoring element can be inserted, which means, of course, that it will always be inserted correctly.

The minimum of one friction lining element can also be retained axially on the friction lining carrier in a reliable manner by attaching axial retaining components to the friction lining carrier to hold the minimum of one friction lining element axially on the friction lining carrier. The design can be simplified even more by providing at least one restoring element on at least one axial retaining component.

So that a sufficient amount of kinetic energy can be converted into friction work and thus dissipated as heat, it is proposed that a friction-increasing layer be provided on the minimum of one friction lining element, namely, on the part of the surface of this element which rests or can be brought to rest against the minimum of one friction lining carrier, and/or on the part of the friction lining carrier which supports the minimum of one friction lining element. This friction-increasing layer can be of the "scattered sintered".

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

Figure 1:
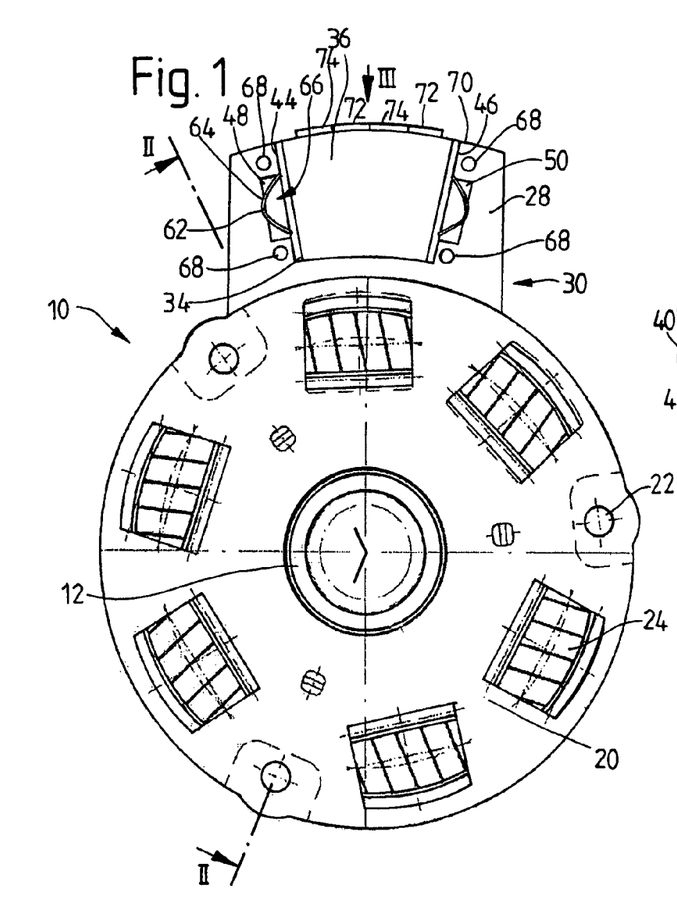
FIG. 1 shows an axial view of a clutch disk according to the invention.
Figures 2, 3, 4:
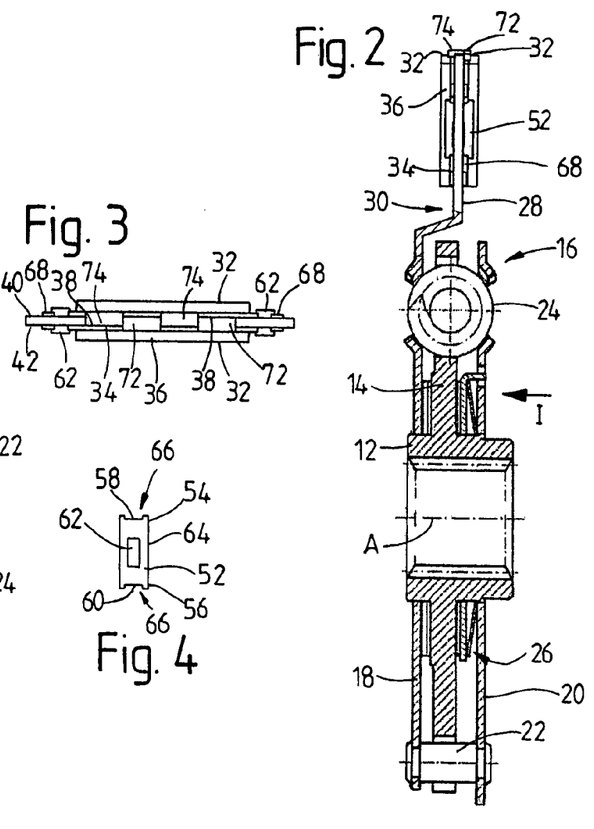
FIG. 2 shows a longitudinal cross section through the clutch disk according to FIG. 1, cut along line II—II of FIG. 1.
FIG. 3 shows a view of the clutch disk according to FIG. 1, looking radially inward from the outside in the direction of the arrow III of FIG. 1.
FIG. 4 shows an elastic restoring element in the relaxed state.

Referring to FIGS. 1 and 2, the clutch disk 10 comprises a hub area 12, which can be connected nonrotatably to a transmission input shaft or the like. In the example shown here, this hub area has, as an integral part, a central disk element 14 of a torsional vibration damper device 16. On each side of this central disk element 14 there is a cover disk element 18, 20, the radially outer areas of which are connected permanently together by clinch bolts 22. The damping springs 24 are supported circumferentially at one end on the central disk element 14; at the other end, they are supported on the two cover disk elements 18, 20, so that the cover disk elements 18, 20 can rotate around an axis of rotation A to a limited extent with respect to the central disk element 14 and thus of the hub area 12, this rotation occurring in opposition to the action of a frictional holding device 26. The cooperation between the central disk element 14 and the clinch bolts 22 also provides the function of limiting the angle around which the cover disks can rotate.

On the cover disk element 18, several radially outward-extending carrier sections 28 are provided, either as Integral parts of the disk element or as separate components attached to it. Of course, it is also possible to provide a ring-like carrier section 28 extending continuously around the circumference. The carrier section 28 or carrier sections 28 of the cover disk element 18 form a friction lining carrier 30.

Friction lining elements 32 are provided at several circumferential points on this friction lining carrier 30, preferably on both axial sides of the carrier. Each of these friction lining elements 32 comprises a carrier plate 34, to which, for example, an inorganic friction lining 36 is permanently attached by bonding with an adhesive, by "melting on", by riveting, or by some other suitable method. The totality of the friction lining elements 32 arranged in a row around the circumference on each of the two axial sides of the friction lining carrier 30 creates a ring-like friction lining element structure, which can be brought into frictional interaction with a pressure plate, with a flywheel, or with some other opposing frictional component of a friction clutch.

The carrier plates 34 of the friction lining elements have rear surfaces 38, which rest against the two axially-facing lateral surfaces 40, 42 of the friction lining carrier 30. In the areas of the friction lining carrier 30 in which the circumferential ends 44, 46 of each of the friction lining elements 32 come to rest, recesses 48, 50 are formed in the friction lining carrier 30. A spring element 52 formed out of flat sheet metal is inserted into each of these recesses 48, 50. It can be seen in FIG. 4 that the spring element 52 has a recess 58, 60 in each of its two end areas 54, 56. The spring element 52 also has an aperture or opening 62 in its central area. When the spring element 52 is bent into the curved shape shown in FIG. 1 and inserted into its associated recess 48, 50, its two end areas 54, 56 will assume positions near the circumferential end areas 44, 46 of the friction lining elements 32 located on the two axial sides 40, 42 of the friction lining carrier 30; at the same time, the opening 62 formed in the central area of the spring element will engage with the friction lining carrier 30. For this purpose, the width of this opening 62 is matched to the thickness of the material of the friction lining carrier 30. In this support area 64, therefore, each of the various spring elements 52 is not only supported in the circumferential direction on the friction lining carrier 30 but also retained axially on it in a defined manner.

The two end areas 54, 56, that is, the recesses or openings 58, 60 provided there, together define an additional support area 66, which holds the two carrier plates 34 of the friction lining elements 32 on the two axial sides. That is, the width of the recesses 58, 60 is designed to accommodate the total axial thickness of the two carrier plates 34, one of which is positioned on each side of the friction lining carrier 30. Thus this second support area 66 holds the spring element 52 in question in a defined axial position; in addition, the two friction lining elements provided on the axial sides 40, 42 of the friction lining carrier 30 are also held tightly in the axial direction on the carrier section 28 of the friction lining carrier 30. Under the deformation or compression of the spring elements 52 held in this pretensioned state in the openings 48, 50, the friction lining elements 32 can move to a certain extent in the circumferential direction with respect to the friction lining carrier 30 when rotational irregularities occur. So that an end stop for this circumferential movement can be provided, several stop elements 68 can be installed in the friction lining carrier 30; these stops can be formed by, for example, pin-rivets, which are held by a press-fit in the friction lining carrier 30.

So that the friction lining elements 32 can be retained in a defined manner on the friction lining carrier 30 not only in the circumferential and axial directions but also in the radially outward direction, tab-like radial retaining projections 72, 74 are provided on the outer circumferential area 70 of the friction lining carrier 30 or of the carrier section 28 of same; these retaining projections 72 are bent over axially toward one side and thus provide radial support for one of the friction lining elements 32, whereas the projections 74 are bent axially toward the other side and thus provide radial support for the other friction lining element. The projections 72, 74 define a displacement path, which conforms to the outer circular circumferential contour of the friction lining elements 32, and along which the friction lining elements 32 can shift when rotational vibrations or rotational irregularities occur.

When rotational irregularities occur and relative circumferential movement of this type takes place between the friction lining elements 32 and the friction lining carrier 30, the rear surfaces 38 of the carrier plates 34 slide along the associated axial sides 40, 42 of the friction lining carrier 30. Thus friction work is performed, so that these circumferential movements occur not only in opposition to the pretensioning force of the spring elements 62, but also in opposition to the frictional force which is generated by the frictional contact between the surfaces 38 and the surfaces 40, 42. In this way, a frictional arrangement is obtained, which contributes to the ability to damp vibrations. So that defined frictional relationships adapted to the given requirements can be created here, it is possible to provide at least one of two surfaces in frictional interaction with each other with a special friction coating or surface structure. This can be done, for example, by roughening the surface or by providing a special friction coating, such as a "scattered sintered" layer. It is especially advantageous in the case of the clutch disk 10 shown in FIGS. 1–4 for the friction lining elements 32 to rest flat over essentially their entire rear surfaces 38 on a corresponding surface or axial side 40, 42 of the friction lining carrier 30, so that frictional interaction is present over a large area; this means that no local contact pressure peaks will be produced under the comparatively high axial loads which occur on a clutch disk.

Figures 5, 6:
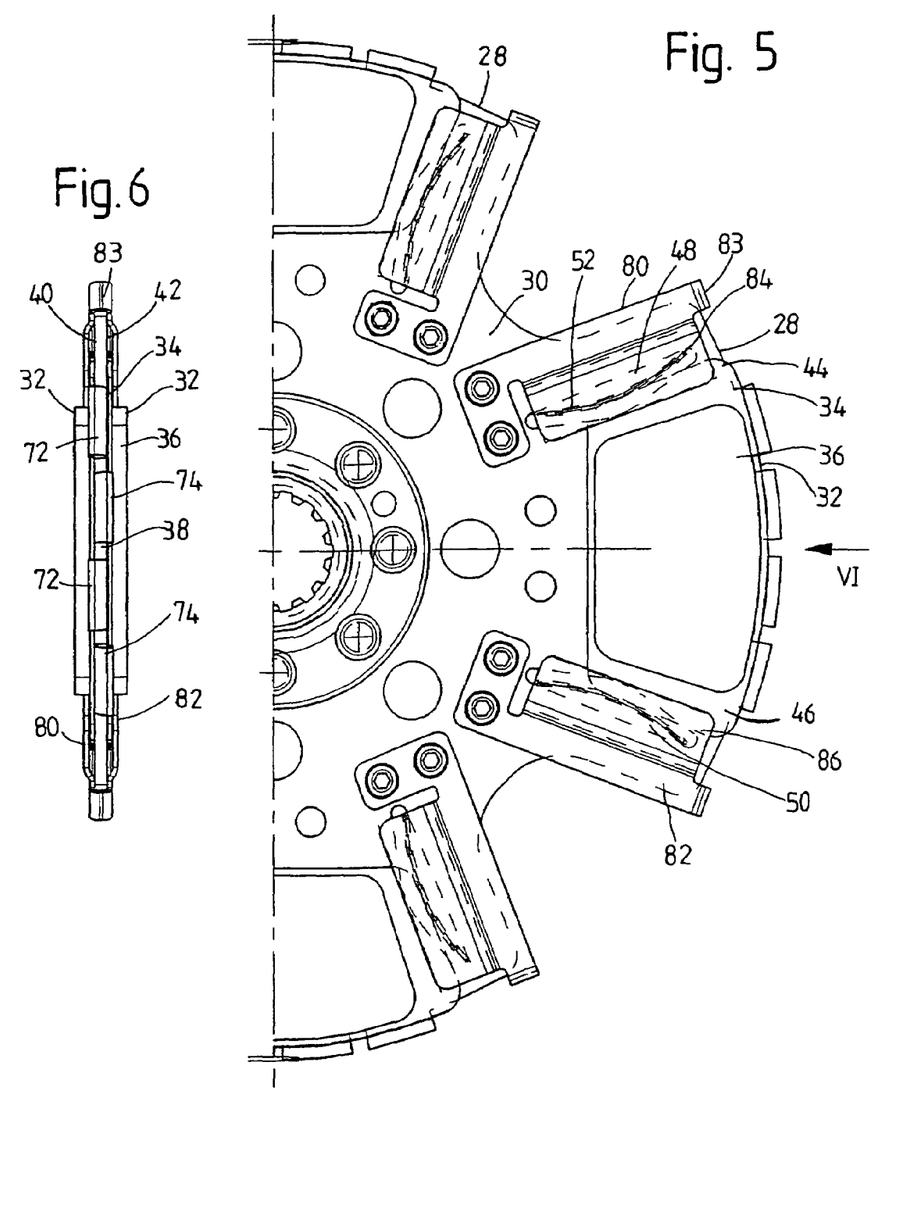
FIG. 5 shows a partial axial view of an alternative embodiment of a clutch disk according to the invention.
FIG. 6 shows a radial view of the clutch disk of FIG. 5, looking in the direction of the arrow VI of FIG. 5.

An alternative embodiment of the clutch disk according to the invention is shown in FIGS. 5 and 6. Here again, a friction lining carrier 30 is provided, which has several radially outward-extending carrier sections 28 arranged around the circumference. A friction lining element 32 is provided on each of the two axial sides 40, 42 of these carrier sections 28. This friction lining element can be designed in the same way as described above; that is, it can have a friction lining 36 on a carrier plate 34. Radially toward the outside, these friction lining elements 32 are again retained by the projections 72, 74, which have been bent over in the axial direction. Two axial retaining elements 80, 82, each of which is attached independently to the friction lining carrier 30, are assigned to each friction lining element 32. Each of these axial retaining elements 80, 82 has a retaining section 84, 86, which extends over the end area 44, 46 of the carrier plate 34 and holds the carrier plate 34 in frictional contact with the friction lining carrier 30. It can be seen in FIG. 5 that there is a circumferential gap between these sections 84, 86 and the circumferential end areas of the friction lining 36, which means that the friction lining elements are able to move a limited extent in the circumferential direction. The cooperation of the sections 84, 86 of the axial retaining elements 80, 82 with the associated friction lining of the friction lining element 32 provides the function of limiting the extent of this circumferential movement. The axial retaining elements 80, 82, which are assigned to the friction lining elements 32 located on each axial side of the friction lining carrier 30, are arranged in pairs, one pair being provided at each of the circumferential end areas of the friction lining elements. The retaining elements of each pair are connected integrally to each other by a radially outer connecting section 83, so that a component 90 with essentially the overall shape of a "U" is obtained. In the radially inner end area of the two U-sidepieces formed by the axial retaining elements 80, 82, this component 90 is permanently connected by rivets or screws or the like to the friction lining carrier 30, i.e., to the carrier section 28.

In the friction lining carrier 30, i.e., in the carrier sections 28 of same, openings 48, 50 are again formed near the circumferential end areas 44, 46 of the friction lining elements 32. Curved spring elements 52, such as leaf spring elements again, are installed in these openings. The springs are thus held in the axial direction between the various sections 84, 86 of the axial retaining elements 80, 82. When the friction lining elements 32 move in the circumferential direction, these spring elements 52 are deformed. When the friction lining elements 32 move in the circumferential direction, a frictional effect is again produced between the rear surfaces 38 and the associated axial side 40, 42 of the friction lining carrier 30, as a result of which again a certain amount of the kinetic energy causing the movement is converted into frictional work and thus into heat.

Figures 7, 8:
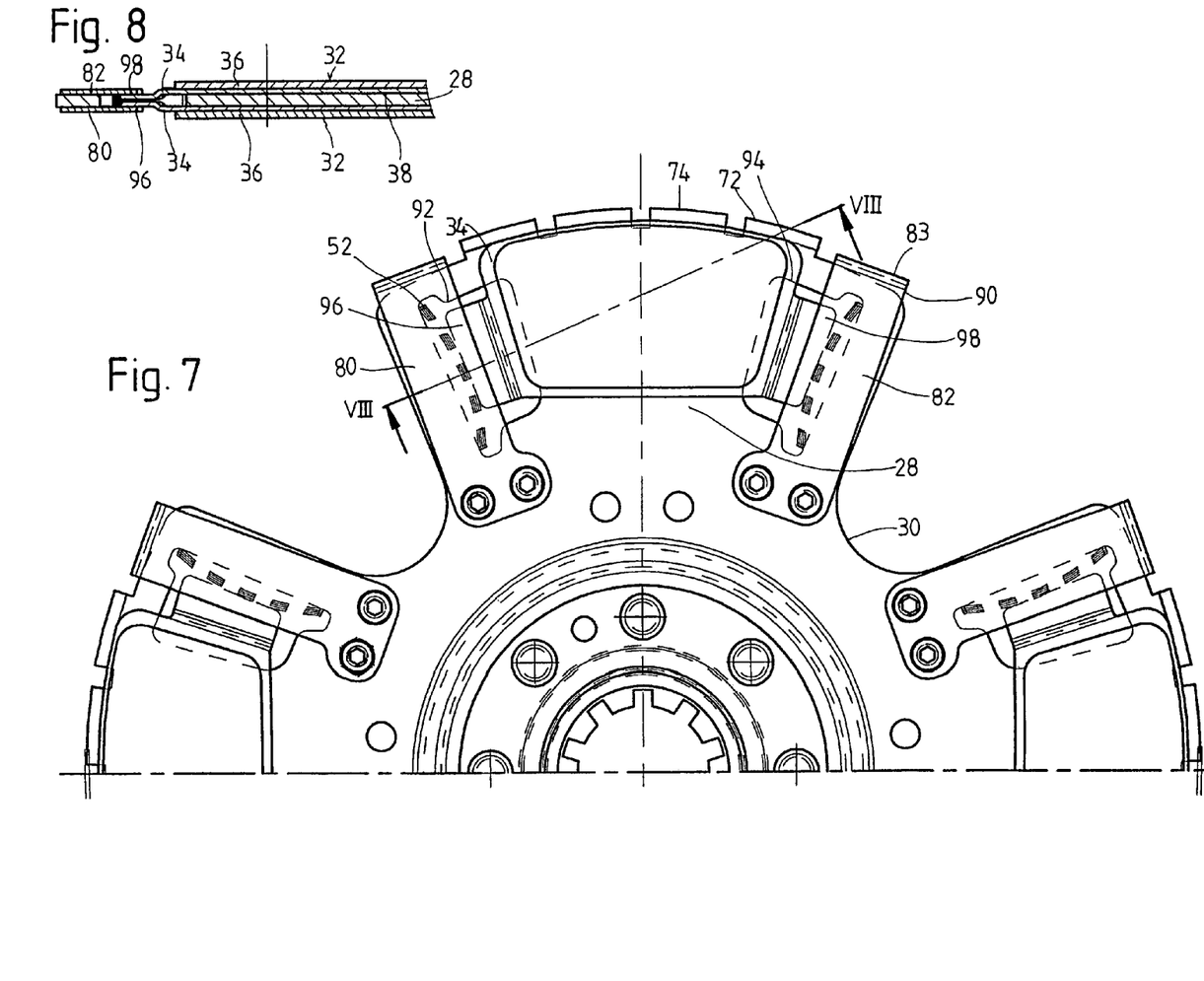
FIG. 7 shows a view, corresponding to that of FIG. 5, of a modified embodiment.
FIG. 8 shows a cross-sectional view of the clutch disk of FIG. 7, cut along line VIII—VIII of FIG. 7.

A modification of the embodiment according to FIGS. 5 and 6 is shown in FIGS. 7 and 8. We see here again the various pairs of axial retaining elements 80, 82, which are connected radially on the outside by a connecting section 83, thus constituting the U-shaped components 90, which are attached radially on the inside to the friction lining carrier 30. Two openings 92, 94 are formed in the circumferential end areas of the carrier section 28; these openings are overlapped by the axial retaining elements 80, 82 of the associated U-shaped component 90, and the circumferential end areas of the carrier plates 34 of the friction lining elements 32 on the two axial sides are positioned in them. These tab-like circumferential end areas 96, 98 of the carrier plates 34 are bent toward each other and rest against each other, as can be seen in FIG. 8. In this way, an intermediate space is formed between the carrier plates 34 in the area where they carry the friction linings 36; the carrier section 28 is held in this intermediate space. The rear surfaces 38 of the carrier plates 34 rest against the carrier section 28.

The tab-like end areas 96, 98 are again supported in the circumferential direction against the friction lining carrier 30, i.e., against peripheral walls of the openings 92, 94, by way of the previously described spring elements 52. In this way, the friction lining elements 32 are again able to move in the circumferential direction relative to the friction lining carrier 30, this circumferential movement again occurring in opposition to the restoring force of the springs 52 and in opposition to the frictional interaction occurring at the rear surfaces of the carrier plates 34 against the carrier section 28.

An essential advantage of the modification shown in FIGS. 7 and 8 is that the U-shaped components 90, which provide the two axial retaining elements 80, 82 in the associated circumferential end areas, can be much simpler in design, because they do not have to be cranked in the axial direction as was the case previously in the variant according to FIG. 5. This also leads to a considerable reduction In the amount of space required, and use can be made of the entire axial thickness of the lining material of the friction linings 36, that is, the linings can in principle be worn down all the way to the carrier plates 34.

Figure 9:
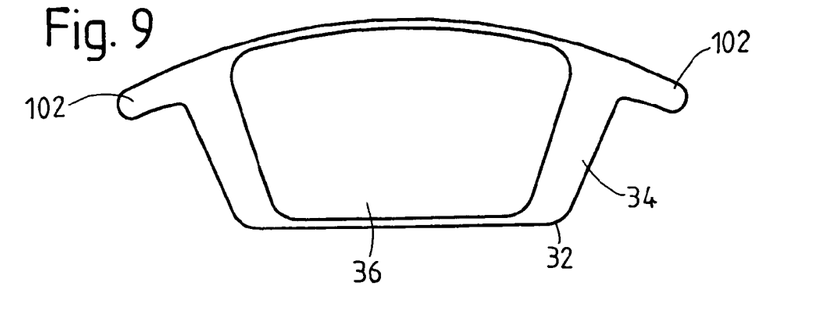
FIG. 9 shows an axial view of a friction lining element, which can be used in an another modification of a clutch disk according to the invention.
Figure 10:
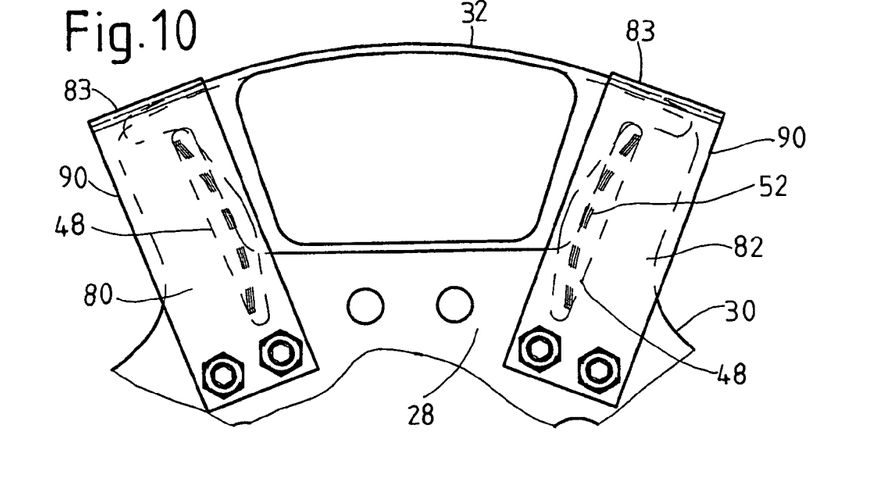
FIG. 10 shows a partial view of a clutch disk according to the invention with the friction lining element shown in FIG. 9.

FIGS. 9 and 10 show a modification of the embodiment of FIGS. 8 and 9 with respect to the radial support of the friction lining elements 32.

It can be seen in FIG. 9 that the radially outer area of each carrier plate 34 has a circumferential projection 100, 102. These are long enough in the circumferential direction to reach under the connecting sections 83 of the U-shaped components 90. In this way, therefore, the U-shaped components 90, with their respective axial retaining elements 80, 82, assume not only the function of retaining the friction lining elements 32 axially but also of supporting them radially. The essential advantage here is that, with reference to the friction lining carrier 30, there is no longer any need for the previously described, radially outward-extending sections, which are then bent over axially; this decreases the amount of mass in the radially outer area and thus also reduces the mass moment of inertia.

Figure 11:
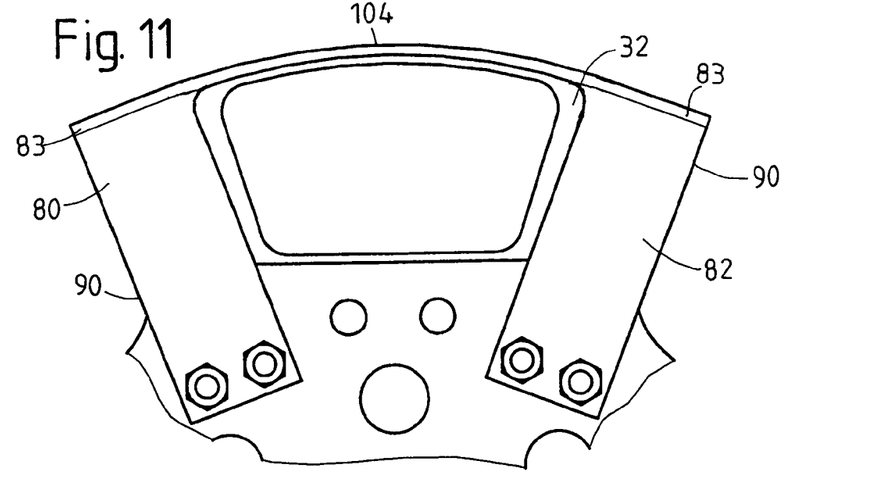
FIG. 11 shows a view, corresponding to FIG. 10, of a modified embodiment.

In the variant shown in FIG. 11, the two U-shaped components 90 assigned to a pair of friction lining elements 32 are connected integrally to a radial support section 104, which joins the connecting sections 83 of the U-shaped components to each other. The two U-shaped components 90, with their associated axial retaining elements 80, 82 and the connecting sections 83 can therefore be stamped as a unit out of a single blank of sheet metal, for example, and bent into the appropriate shape. In this variant, the friction lining elements 32 can be supported radially on the outside by the section 104 or by the connecting sections 83. Otherwise, this variant is the same as that described previously.

Figure 12:
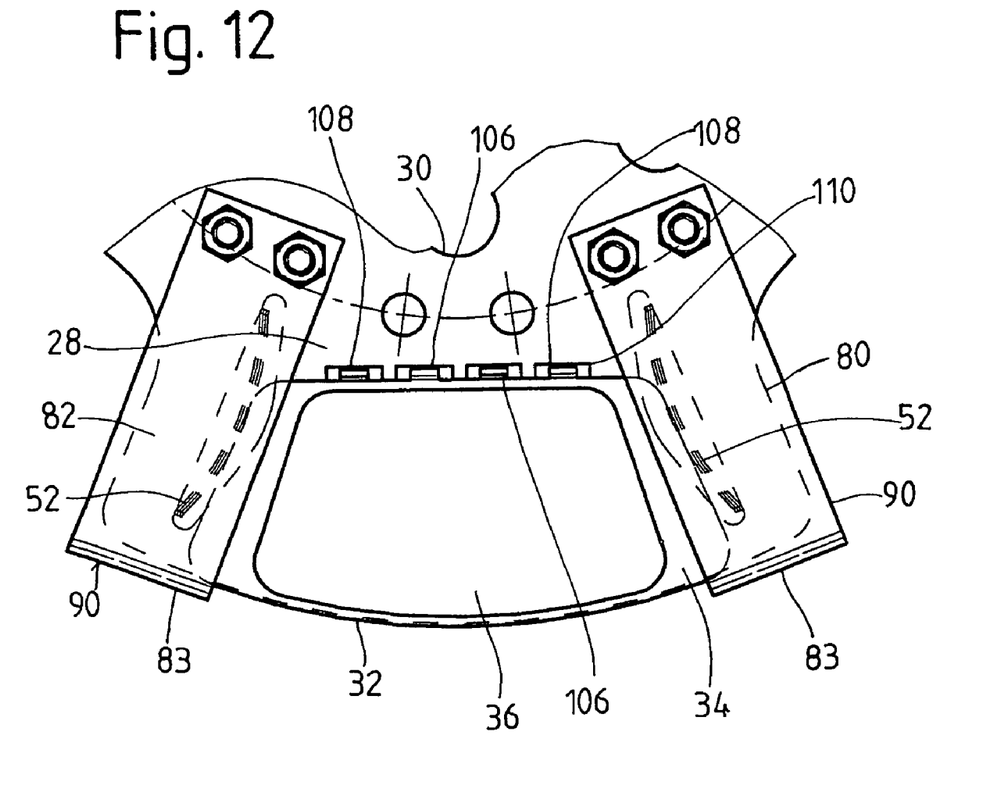
FIG. 12 shows another view, corresponding to FIG. 10, of an alternative embodiment.
Figure 13:
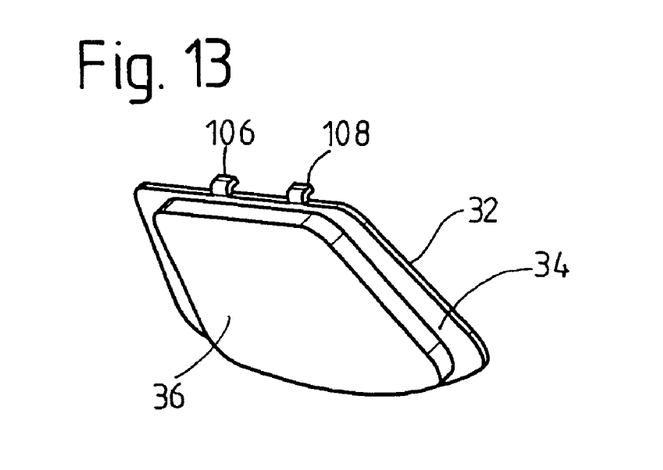
FIG. 13 shows a perspective view of a friction lining element used in the embodiment of FIG. 12.

Another alternative embodiment with respect to radial support is shown in FIGS. 12 and 13. It can be seen here that, in the radially inner area, axially bent retaining sections 106, 108 are provided on the carrier plates 34 of the friction lining elements 32. Assigned to these are pass-through openings 110 in the friction lining carrier 30, i.e., in the carrier section 28 of the carrier; these openings are slightly larger in the circumferential direction than the sections 106, 108. When the carrier plates 34 are resting against the carrier section 28, the sections 106, 108 engage in these openings 110 and thus hold the friction lining elements 32 in the radial direction against the centrifugal force which develops during rotational operation. At the same time, because of the circumferential dimensions just mentioned, it is possible for the friction lining elements 32 to move to a limited extent in the circumferential direction.

In this variant, the previously described aspect of the reduction of the mass moment of inertia is even more pronounced as a result of the elimination of radially outer sections of mass.

Figure 14:
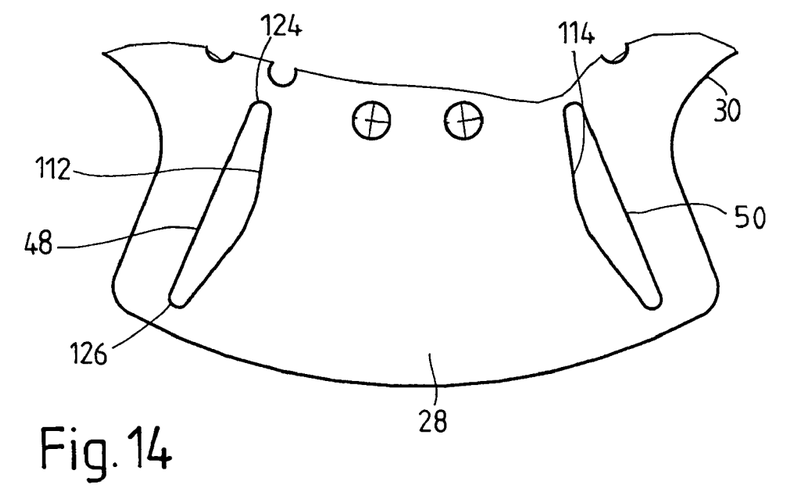
FIG. 14 shows a partial view of a friction lining carrier used in a clutch disk according to the invention.
Figure 15:
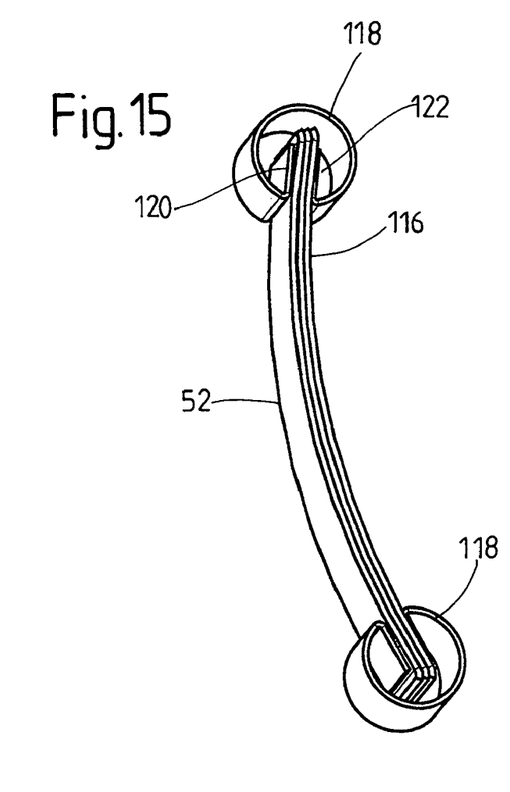
FIG. 15 shows a perspective view of a stack of leaf springs, which produces a circumferential restoring force.

FIGS. 14 and 15 show additional aspects of the previously described embodiments. For example, FIG. 14 shows a carrier section 28 of a friction lining carrier 30 with the two openings 48, 50 assigned to the spring elements 52. These openings 48, 50 are designed so that they conform basically to the curved shape of the spring elements 52, which provide the circumferential elasticity; in the example shown here, these are the leaf spring elements 52. Because these spring elements 52, as is clear from FIG. 15, are precurved, that is, because they are already slightly curved even before any load is exerted on them, the facing sides of the two openings 48, 50 have concave areas 112, 114 to accommodate this curvature or convexity of the spring elements 52; as can be seen in FIG. 10, for example, the spring elements 52 with their convex shape fit into these concave areas. This ensures that the spring elements 52 cannot be installed incorrectly in the two openings 48, 50.

A further aspect is shown in FIG. 15. Here it can be seen that each spring element 52 can comprise a stack of individual leaf springs 116. To simplify the construction and to facilitate the insertion of these leaf springs 116 into the associated openings 48, 50 or also 92, 94 of the embodiment according to FIG. 7, these stacks of leaf springs 116 are held together at their ends by ring-shaped clamping elements 118. These ring-shaped clamping elements 118 have clamping faces, which rest against the two sides of the leaf spring stack; the end areas of the leaf springs 116 are thus held between these clamping faces. The leaf springs 116 are inserted together with these ring-shaped clamping elements 118 into the openings 48, 50 and are thus also supported on the carrier section 28 by these clamping elements 118. It is not necessary to remove the clamping elements 118 from the leaf springs 116 when the springs are inserted. This feature not only simplifies the assembly process but also ensures that no linear or edge-like contact occurs between the spring elements 52 or the clamping elements 118 of same and the carrier section 28 of the friction lining carrier 30; instead, the contact is established over a 2-dimensional surface. For this purpose, the openings 48, 50 can be designed in their radially inner or radially outer end areas 124, 126 with a curvature which matches the curvature of the ring-shaped clamping elements 118. The leaf springs 116 can thus be prevented from digging themselves into the friction lining carrier 30 throughout their operating life.

Figure 16:
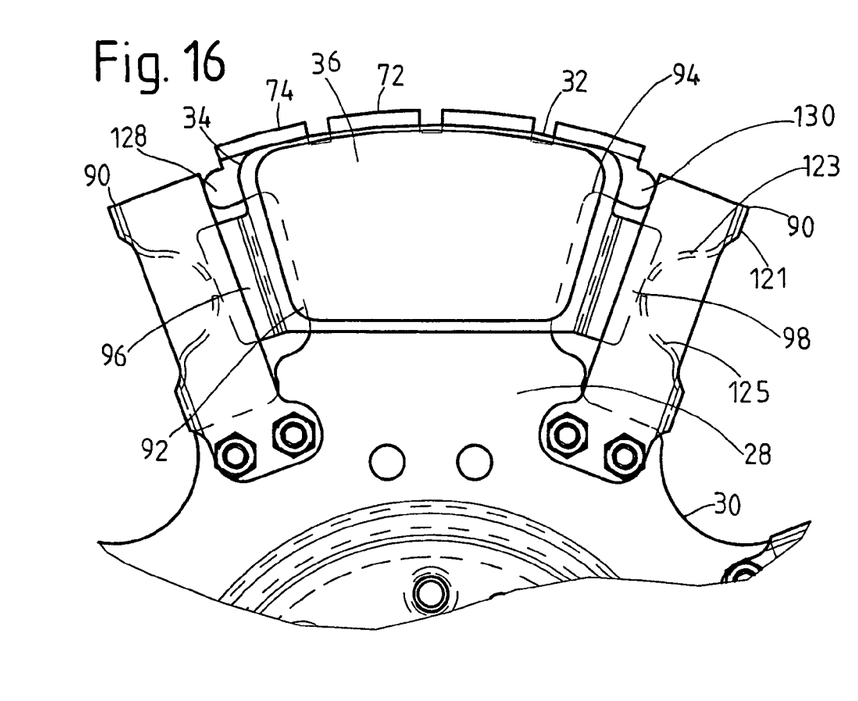
FIG. 16 shows another partial axial view of an alternative embodiment of a clutch disk according to the invention.
Figure 17:
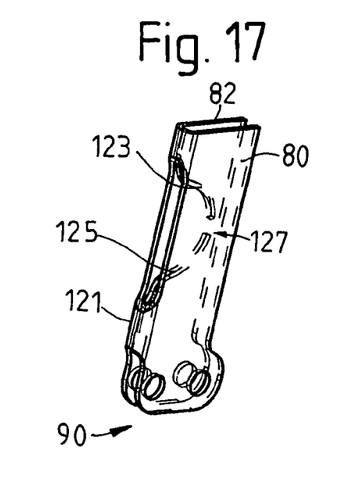
FIG. 17 shows a perspective view of an axial retaining component used in the clutch disk according to FIG. 16.

FIGS. 16 and 17 show another modification of the previously described embodiments. This modification pertains primarily to the installation of the elastic elements which pretension or support the friction lining elements 32 in the circumferential direction.

It can be seen first in FIG. 16 that the larger openings 92, 94 are again formed in the carrier section 28, but now they are not closed off in the circumferential direction by sections of material on the carrier section 28. Instead, these openings 92, 94 are open in the circumferential direction, and the tab-like end areas of the carrier plates 96, 98, as in the case of the embodiment according to FIGS. 7 and 8, fit into these openings or recesses 92, 94, which are now open in the circumferential direction.

The U-shaped components 90, 92, which provide the axial retaining elements 80, 82 positioned in the circumferential end areas of the friction lining elements 32 are now designed in such a way that the axial retaining elements 80, 82 are not connected in a radially outer area by a connecting section but are instead connected to each other in a circumferential end area by a connecting section 121 extending from the radially inner end toward the radially outer end. This connecting section 121, however, is interrupted; that is, its central area is stamped out, for example, so that the two axial retaining elements 80, 82 are now connected integrally to each other in two places, namely, at their radially inner end and at their radially outer end. The area of the connecting section 121 between the two ends forms two spring tongues 123, 125, which are bent in such a way that they lie essentially between the two axial retaining elements 80, 82, where they provide circumferential support for the end areas 96, 98 of the carrier plates 34. The presence of a small intermediate space 127 between the two spring tongues 123, 125 means that the tongues are not rigidly connected to each other; this also means that they can be given almost any desired shape while at the same time providing the required circumferential elasticity and restoring force during the circumferential displacement of the friction lining elements 32.

As a result of the integration of these spring sections 123, 125 into the U-shaped components 90, the overall design becomes much simpler, especially because it is no longer necessary to insert spring elements in a separate process, and to this extent the number of individual components is also decreased. To limit the extent to which the friction lining elements 32 can move in the circumferential direction and thus to prevent excessive loads from being exerted on the spring tongues 123, 125, rivet elements 128, 130, for example, can be provided in the carrier section 28 in the areas situated, for example, outside the openings 92, 94; the carrier plates 34 will strike these rivets when excessive circumferential movement occurs. In principle, this circumferential movement-limiting function could also be performed by the U-shaped components 90.

Figure 18:
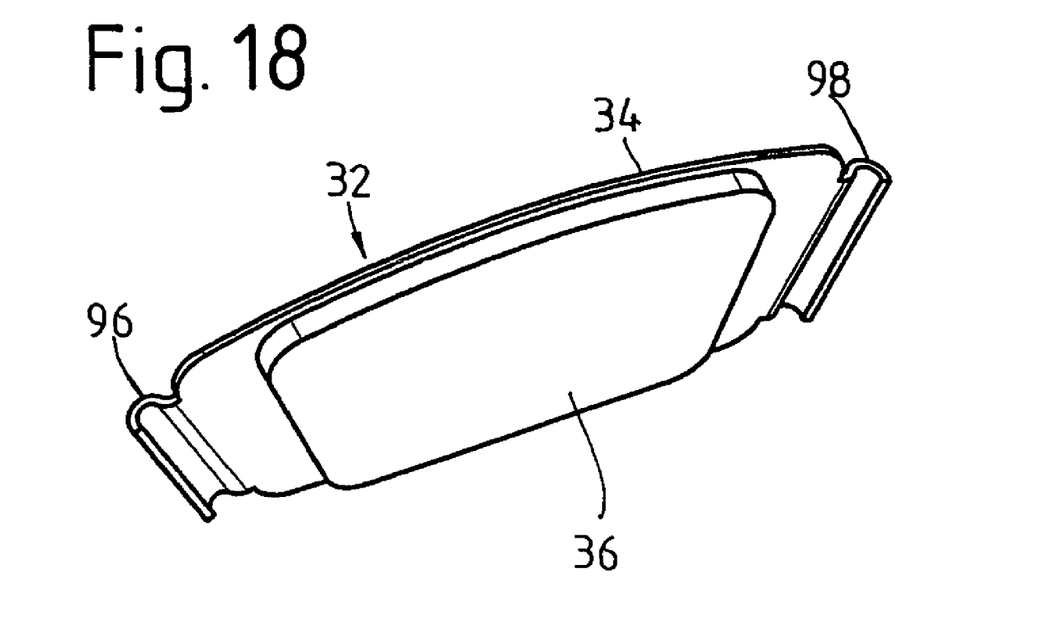
FIG. 18 shows an alternative design of a friction lining element with integrated circumferential spring-loading.

Another variant for providing this circumferential elasticity is shown in FIG. 18. A friction lining element 32 with its carrier plate 34, on which a friction lining 36 is supported, can be seen here. The two tab-like end areas 96, 98 are bent over to assume, for example, a contour in the shape of a segment of a circle, which gives these end areas 96, 98 a certain circumferential elasticity. As integral parts of the friction lining elements 32, these tab-like end areas 96, 98, which now provide the circumferential elasticity, can be supported against the connecting sections 121 of the U-shaped components 90 visible in FIGS. 16 and 17; or, for example, the walls which form the circumferential boundaries of the openings 92, 94, as can be seen in the embodiment according to FIG. 7, can provide this support.

Figure 19:
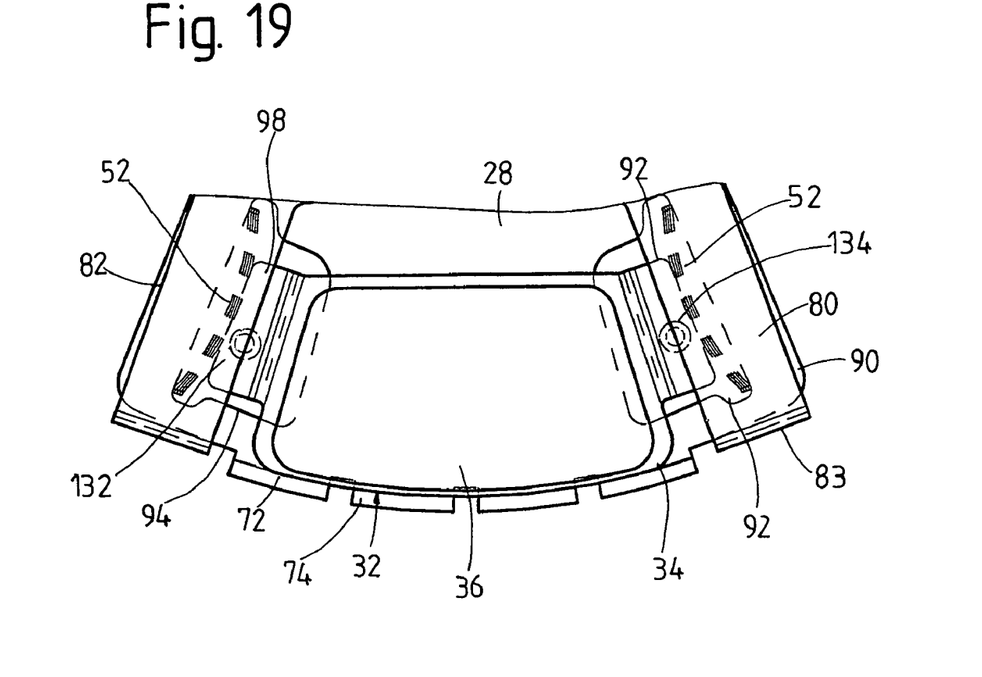
FIG. 19 shows another partial axial view of an alternative embodiment of a clutch disk according to the invention.
Figure 20:
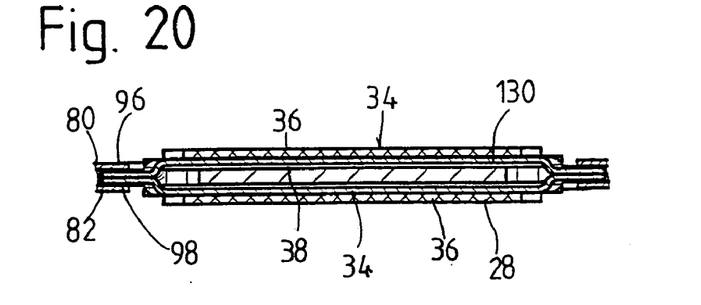
FIG. 20 shows a circumferential cross section through the clutch disk shown in FIG. 19.

Embodiments have been described above in which the friction lining elements 32, specifically their carrier plates 34, rest essentially permanently against the friction lining carrier 30, i.e., against the support section 28 of same, and when these friction lining elements 32 are clamped between a pressure plate and a flywheel or the like, an increased amount of frictional interaction is produced. FIGS. 19 and 20 now show a variant in which, basically, a small intermediate space 130 is formed between the friction lining elements 32, i.e., their carrier plates 34, and the friction lining carrier 30. When a clutch disk designed in this way is clamped in the axial direction, however, this space is reduced and is eventually reduced to zero, so that, after a certain spring travel has been completed under the application of a certain axial clamping force, the previously discussed frictional interaction occurs again.

What can be seen first in FIG. 19 is a design which is essentially the same as that described above with reference to FIG. 7. Here, too, therefore, each pair of friction lining elements 32 is supported circumferentially against the carrier section 28 by the spring elements 52, which are positioned in the openings 92, 94, in the area of the tab-like circumferential ends 96, 98 of the carrier plates 34 of the friction lining elements 32. It can be seen in FIG. 20, however, that, in the transition area leading to the tab-like end areas 96, 98, the carrier plates 34 are cranked so sharply that, in the unloaded state, a small intermediate space 130 is present between the carrier section 28 and the rear surface 38 of the carrier plates 34, in spite of the fact that the end sections 96, 98 are resting axially against each other or are possibly even permanently connected to each other. The curved shape formed by the cranking in the transition area leading to the tab-like end areas 96, 98 has the effect of incorporating a certain axial elasticity into the carrier plates 34, so that, when an arrangement of this type is clamped and force is exerted on the friction linings 36, the carrier plates 34 are pressed by their rear surfaces 38 against the carrier section 28, and once again a frictional force, already discussed above, opposes the circumferential movement of the friction lining elements 32 and the restoring force of the spring elements 52.

As a result of the integration of a certain elasticity into the friction lining elements 32, a greater smoothness is achieved during the clutch-engaging operation, because, first, at the beginning of the frictional actuation of the friction linings 36, only the spring elements 52 oppose the relative circumferential movement between the friction lining elements 32 and the friction lining carrier 30. Only after a certain short axial inward spring travel has been completed does the frictional force discussed above go into effect. Thus, a soft transition into a range of stronger circumferential engagement of the friction lining elements 32 occurs, accompanied by an equally soft buildup of the axial clamping force, attributable to the possibility of inward elastic travel. In this embodiment, for example, it would also be possible for the elastic elements 132, 134 visible in FIG. 19 to be positioned between the end areas 98 of the carrier plates 34, which then guarantee the above-discussed inward elastic travel function with possibly only a slight cranking or no cranking at all of the carrier plates 34. These elastic elements 132, 134 can be designed as helical compression springs, for example, or as elastomeric blocks, etc.

Figure 21:
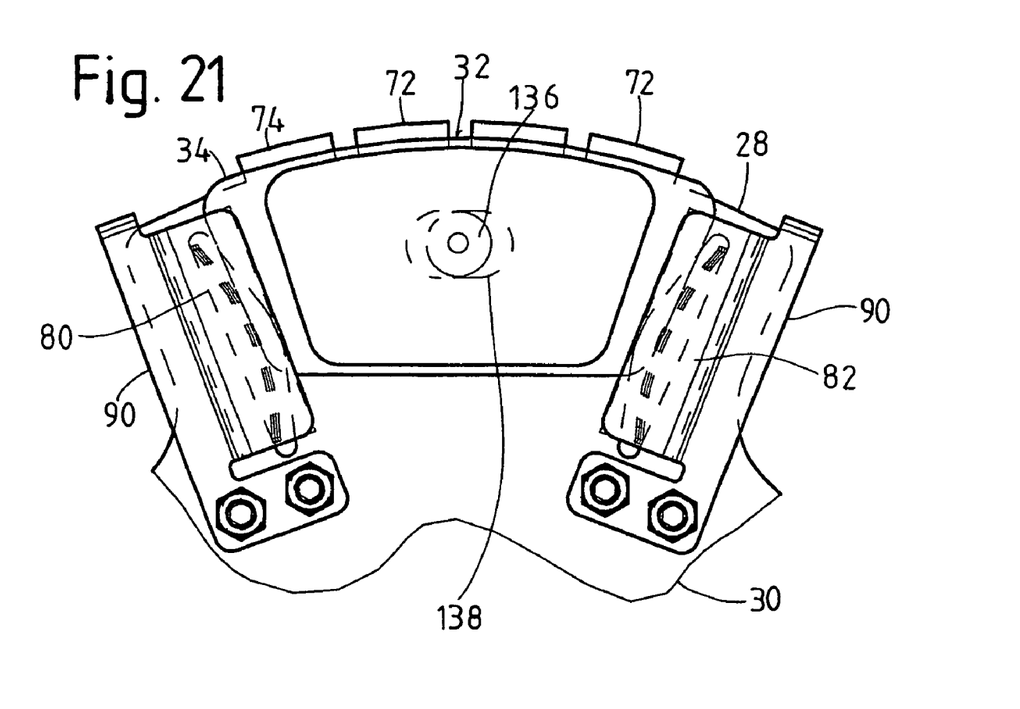
FIG. 21 shows a view, corresponding to FIG. 19, of another alternative embodiment.

Another modification of this structural principle, based essentially on the embodiment according to FIGS. 5 and 6, is illustrated in FIG. 21. Here a spring element 136, positioned in a central circumferential area of the friction lining elements, acts between the two friction lining elements 32 on opposite axial sides of the carrier section 28; this spring element Is positioned in an opening 138, elongated in the circumferential direction, in the carrier section 28, and pretensions the two friction lining elements 32 in such a way that they try to move axially away from each other. These friction lining elements are thus supported against the axial retaining elements 80, 82 of the U-shaped components 90, so that, in the unloaded state, there is basically no frictional interaction between the carrier plates 34 and the carrier section 28.

It is obvious that, in this embodiment as well, the circumferential integration of the carrier plates 34 and the design of the U-shaped components 90 can be realized as described above with reference to FIGS. 7–20.

Figure 22:
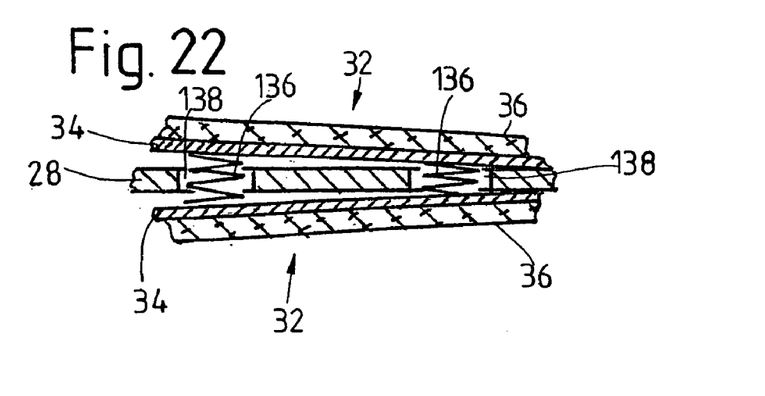
FIG. 22 shows a partial circumferential cross section through an elaboration of the embodiment shown in FIG. 21.

To achieve a more uniform pretension of the friction lining elements 32 axially away from each other, it is obvious that several of these types of spring elements 136, possibly helical compression springs or the like, can be distributed around the circumference and also in the radial direction. Thus, for example, FIG. 22 shows a variant in which two of these types of spring elements 136 are present, offset from each other in the circumferential direction. This embodiment can also have the feature that the two spring elements 136 have different spring constants, or it can also be provided that, in cooperation with the associated axial retaining elements 80, 82, in a state in which essentially no axial clamping load is being exerted, the two friction lining elements 32 are not parallel to each other, i.e., they form a certain small wedge angle with each other. The provision of this wedge shape in the unloaded state can prevent the occurrence of frictional vibrations when the clutch is subsequently engaged. This obviously can also be achieved by providing only a single spring element 136, as shown in FIG. 21. This can then be designed in such a way that it exerts a nonuniform load on the two friction lining elements 32. It is possible to achieve this type of effect when only one spring element 136 is used by designing the U-shaped components 90 in the two circumferential end areas differently from each other, that is, by providing for example, a larger axial distance between the axial retaining elements 80, 82 and one of the two U-shaped components 90.

Figure 23:
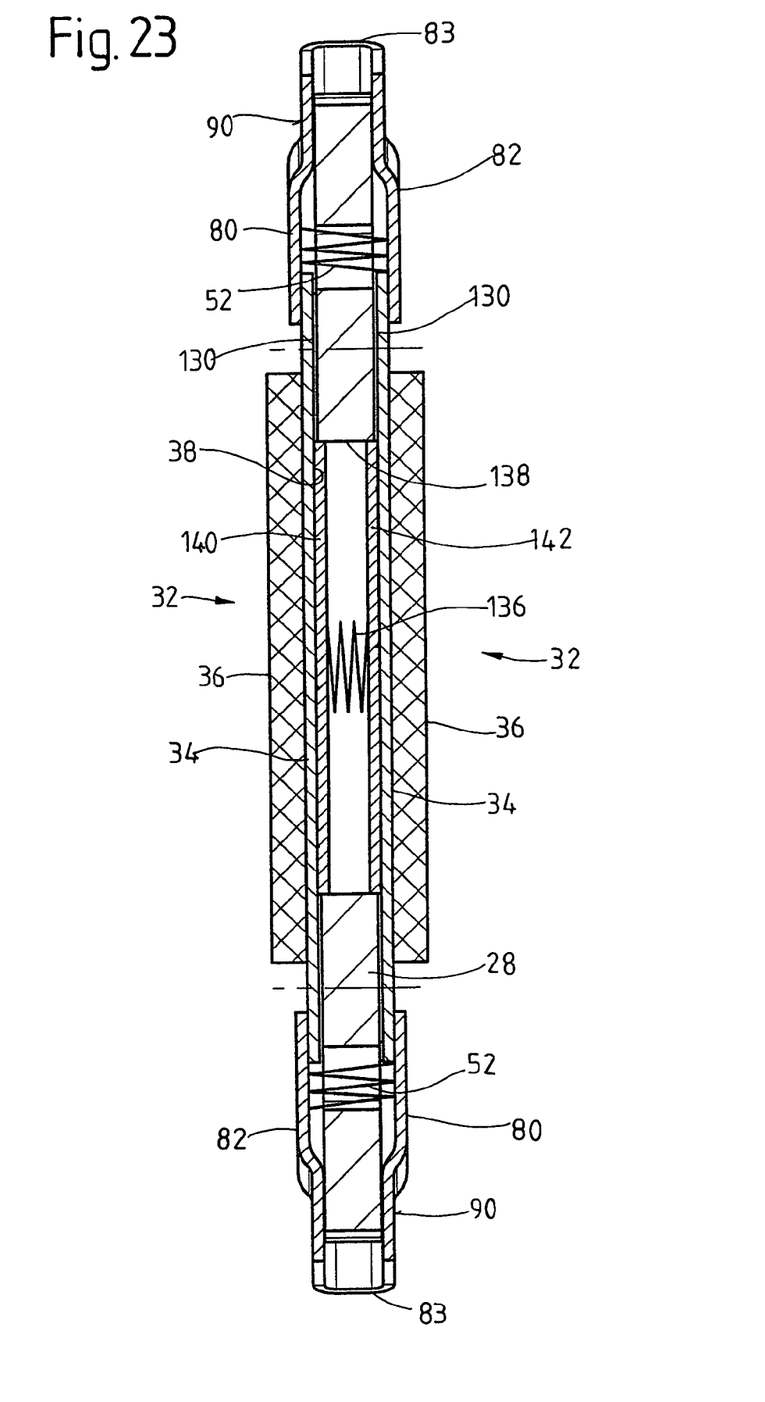
FIG. 23 shows a circumferential cross section through another embodiment of a clutch disk according to the invention.

Another design with integrated axial elasticity is shown in FIG. 23. Here we can see again a spring element 136, which is held in an opening 138 in the carrier section 28, which is now provided with larger dimensions. The spring element pretensions the two friction lining elements 32 axially away from each other. The spring element 136, however, does not act directly on the friction lining elements 32 or on the carrier plates 34 of the lining elements. Instead, two friction plates 140, 142 are fitted into the opening 138, between which the spring element now lies and acts. The spring element 136 tensions the two friction plates 140, 142 axially away from each other, so that these are pressed against the rear surfaces 38 of the two carrier plates 34. In the axially unloaded state, there is thus again an intermediate axial space 130 between the carrier plates 134, i.e., the friction lining elements 132, and the carrier section 28. In this state, too, there is also contact and thus also frictional contact between the carrier plates 34 and the friction plates 140, 142.

When axial load is exerted, the spring element 136, several of which could also be provided here as well, as should be obvious, is axially compressed, so that the friction plates 140, 142, which can be fitted essentially without circumferential or radial play into the opening 138, travel elastically more deeply into this opening 138. This process lasts until ultimately the carrier plates 34 come to rest against the carrier section 28, which makes any further Inward axial spring travel impossible. The amount of frictional force acting in this state is determined, first, by the axial clamping force and by the frictional contact between the carrier plates 34 and the carrier section 28, and, second, by the frictional contact between the carrier plates 34 and the friction plates 140, 142 attributable to the pretensioning force of the spring element 136, In this way, it is possible, especially through the selection of the material of the friction plates 140, 142, to adjust the frictional forces occurring in the various phases of a friction process in a defined manner.

It should be pointed out that the various aspects described above on the basis of the various embodiments can obviously be combined with each other. Thus the means used to provide the axial elasticity are essentially independent of how the circumferential elasticity is provided, just as it would obviously be possible to design components 90 in different ways. Here, too, the selected means of radial support can also be combined in any desired way with the various previously described aspects.

In the case of the previously described embodiments, it is especially advantageous that, by exploiting the clutch-engaging force present In the clutch, the surfaces of the friction lining elements which interact frictionally with the friction lining carrier are pressed more strongly against the carrier, so that the effect which is desired in accordance with the invention, namely the production of a frictional force during the circumferential movement of the friction lining elements with respect to the friction lining carrier, is made even stronger with the help of the clutch-engaging force.

It is obvious that various changes can be made to the embodiments described above. Thus, it is obvious that other types of elastic elements such as helical compression springs, elastomeric materials, etc., can be used in place of the leaf spring elements illustrated. Especially in the embodiment of FIG. 1, the function of the axial retention of the friction lining elements could also be fulfilled by separate axial retaining elements.

The invention is not limited by the embodiments described above which are presented as examples only but can be modified in various ways within the scope of protection defined by the appended patent claims.

We claim:

1. A clutch disk for a friction clutch, said clutch disk comprising:
    a friction lining carrier which can be mounted for rotation about an axis;
    at least one friction lining element connected to said friction lining carrier for rotation in common with said friction lining carrier, said at least one friction lining element being displaceable circumferentially with respect to said carrier by a limited amount, said each said friction lining element having a radially outer area;
    a restoring arrangement which preloads said at least one friction lining element against circumferential displacement with respect to said friction lining carrier;
    means for generating a friction force which opposes displacement of said at least one friction lining element with respect to said friction lining carrier; and at least one holding component holding each said friction lining element axially on the friction lining carrier, each said holding component having a radial retaining portion extending axially over each said radially outer area.

2. The clutch disk of claim 1, wherein each said friction lining element has a friction surface and an oppositely facing rear surface which rests against an axial support surface of said friction lining carrier to generate said friction force.

3. The clutch disk of claim 2, wherein each said friction lining element comprises a carrier plate which carries a friction lining, said rear surface being provided by said carrier plate.

4. The clutch disk of claim 1, further comprising an axial pretensioning arrangement assigned to each said friction lining element and pretensioning the friction lining element in such a way that the friction force is reduced when the clutch disk is not engaged.

5. The clutch disk of claim 4, wherein the axial pretensioning arrangement comprises at least one spring element.

6. The clutch disk of claim 5, wherein said at least one spring element is provided on the at least one friction lining element.

7. The clutch disk of claim 5, further comprising a friction element interposed between said at least one spring element and said friction lining element, said friction element being displaceable essentially only axially with respect to with respect to said friction lining carrier.

8. The clutch disk of claim 1, wherein each said friction lining element has a pair of circumferentially opposed end areas, said restoring arrangement comprising restoring elements which act on respective said end areas.

9. The clutch disk of claim 8, wherein at least one of said restoring elements comprises a leaf spring.

10. The clutch disk of claim 9, wherein each said at least one of said restoring elements comprises a plurality of leaf springs and a pair of retaining elements holding said leaf springs together.

11. The clutch disk of claim 10, wherein said retaining elements are supported on said friction lining carrier.

12. The clutch disk of claim 8, wherein said friction lining carrier comprises recesses which receive respective said restoring elements, each said recess having a holding area which conforms to said restoring element.

13. A clutch disk for a friction clutch, said clutch disk comprising:
a friction lining carrier which can be mounted for rotation about an axis:
at least one friction lining element connected to said friction lining carrier for rotation in common with said friction lining carrier, said at least one friction lining element being displaceable circumferentially with respect to said carrier by a limited amount, each said friction lining element having a friction surface and an oppositely facing rear surface which rests against an axial support surface of said friction lining carrier to generate said friction force;
a restoring arrangement which preloads said at least one friction lining element against circumferential displacement with respect to said friction lining carrier;
means for generating a friction force which opposes displacement of said at least one friction lining element with respect to said friction lining carrier; and
a friction increasing layer provided on one of said rear surface of each said friction lining element and each said axial support surface of said friction lining carrier.

14. The clutch disk of claim 13, wherein each said friction lining element has a radially outer area, said friction lining carrier comprising at least one radial retaining projection extending axially over each said radially outer area.

15. The clutch disk of claim 13, wherein said friction lining carrier comprises at least one opening adjacent to each said friction lining element, each said friction lining element having at least one radial retaining projection which engages a respect said at least one opening.

16. The clutch disk of claim 13, wherein said restoring arrangement includes restoring elements, each of said restoring elements comprises a first support area, which engages the friction lining carrier, and a second support area, which engages a respective circumferential end area of said friction lining element, said first and second support areas holding said at least one friction lining element axially with respect to said friction lining carrier.

17. The clutch disk of claim 16, wherein each said first support area comprises a retaining opening which engages said carrier, and each said second support area comprises at least one retaining opening which engages said friction lining element.

18. The clutch disk of claim 13, further comprising axial retaining components attached to the friction lining carrier to hold the at least one friction lining element axially in place.

19. The clutch disk of claim 13, further comprising axial retaining components attached to the friction lining carrier to hold the at least one friction lining element axially in place, each said restoring element being provided on one of said axial retaining components.

20. A clutch disk for a friction clutch, said clutch disk comprising:
a friction lining carrier which can be mounted for rotation about an axis;
at least one friction lining element connected to said friction lining carrier for rotation in common with said friction lining carrier, said at least one friction lining element being displaceable circumferentially with respect to said carrier by a limited amount, each said friction lining element having a friction surface and an oppositely facing rear surface which rests against an axial support surface of said friction lining carrier to generate said friction force;
a restoring arrangement which preloads said at least one friction lining element against circumferential displacement with respect to said friction lining carrier;
means for generating a friction force which opposes displacement of said at least one friction lining element with respect to said friction lining carrier; and
a friction increasing layer provided on one of said rear surface of each said friction lining element and each said axial support surface of said friction lining carrier, wherein each said friction increasing layer comprises a scatter sintered layer.

* * * * *